United States Patent Office 3,652,683
Patented Mar. 28, 1972

3,652,683
2-(1-HALOETHYL)-6-METHOXYNAPHTHALENES
Ian T. Harrison, Palo Alto, Calif., assignor to Syntex
Corporation, Panama, Panama
No Drawing. Filed Sept. 30, 1969, Ser. No. 862,473
Int. Cl. C07c 43/20
U.S. Cl. 260—612 D                    2 Claims

ABSTRACT OF THE DISCLOSURE 2-(6-methoxy-2-naphthyl)propionic acid is prepared by reacting a 2-(1-haloethyl)-6-methoxynaphthalene with nickel carbonyl in a lower t-alkanol solvent in the presence of an alkali metal t-alkoxide until a t-alkyl 2-(6-methoxy-2-naphthyl)propionate is formed, and hydrolyzing the ester group thereof. The product has anti-inflammatory, analgesic and anti-pyretic activities.

---

This invention relates to a process for preparing 2-(6-methoxy-2-naphthyl)propionic acid.

In general, the process of this invention for preparing 2-(6-methoxy-2-naphthyl)propionic acid comprises the steps of reacting 2-(1-haloethyl)-6-methoxynaphthalene with nickel carbonyl in a lower t-alkanol solvent in the presence of an alkali metal t-alkoxide until a t-alkyl 2-(6-methoxy-2-naphthyl)propionate is formed; hydrolyzing the ester group of the 2-(6-methoxy-2-naphthyl)propionate; and separating 2-(6-methoxy-2-naphthyl)propionic acid from the reaction mixture. Suitable halo groups include chloro, iodo and bromo. Preferably, the product is resolved to yield d 2-(6-methoxy-2-naphthyl)propionic acid as the final product.

The process of this invention can be represented by the following formulas:

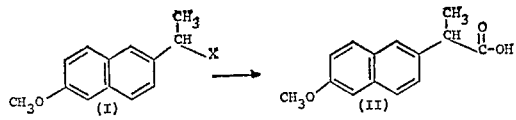

wherein X is bromo, iodo or chloro.

The compound of Formula II is prepared by reacting the compounds of Formula I with nickel carbonyl in a lower t-alkanol solvent in the presence of an alkali metal t-alkoxide until a t-alkyl 2-(6-methoxy-2-naphthyl)propionate is formed.

The reaction mixture should contain at least 1 and preferably from 3 to 20 molar equivalents of nickel carbonyl.

Suitable t-alkanol solvents for the reaction include lower tertiary alkanols such as t-butanol, t-pentanol, 2-methyl-2-pentanol, 3-methyl-3-pentanol and the like.

Suitable alkali metal t-alkoxides include the sodium, potassium and lithium t-alkoxides of lower t-alkanols as described above, e.q. sodium, lithium, and potassium t-butoxides and the like. The reaction mixture should contain at least 1 and preferably from 2 to 5 molar equivalents of the alkali metal t-alkoxide.

The reaction is carried out at a temperature of from 0° C. to the reflux temperature of the solution, preferably temperatures of above 30° C. The time required for the reaction depends upon the temperature of the reaction mixture, times of from 1 hour to 4 days usually being sufficient.

The reaction product is then hydrolyzed to form the free acid by basic hydrolysis followed by acidification or by treatment with a strong acid. For basic hydrolysis, water alone or a solution of a strong base such as sodium or potassium hydroxide in a suitable solvent such as water is mixed with the reaction mixture, and the reaction mixture is maintained at a temperature of from 25° C. to reflux temperature until hydrolysis occurs. Usually from 10 minutes to 6 hours is sufficient for this hydrolysis. The reaction mixture is then acidified with an acid such as acetic acid, trifluoroacetic acid, p-toluenesulfonic acid, hydrochloric acid, sulfuric acid, phosphoric acid and the like to release the free acid.

Alternatively, the reaction mixture is mixed with an excess of a solution of a strong organic or inorganic acid such as trifluoroacetic acid, p-toluenesulfonic acid, hydrochloric acid, hydrobromic acid, hydroiodic acid, sulfuric acid, phosphoric acid and the like at a temperature of at least 60° C. and preferably from 90° C. to the boiling point of the mixture until the hydrolysis occurs. The time required depends upon the reaction temperature, from 1 to 48 hours usually being sufficient. Suitable solvents for the acid include water, acetic acid, aqueous alcohols, and the like. If the acid hydrolysis is used, the free acid is formed directly. If necessary, the reaction mixture can be diluted with water, precipitating the product.

The product compound of Formula II is then separated from the reaction mixture by conventional procedures. For example, when the reaction mixture is acidified, the compound of Formula II precipitates, and it can be removed by filtration and recrystallized from acetone-hexane. Alternatively, the acid can be removed by extraction with ether or a similar solvent. Chromatography can also be used to purify and isolate the product compound of Formula II.

The preferred compound of Formula II is d 2-(6-methoxy-2-naphthyl)propionic acid. To obtain this product, optical resolution of the compound of Formula II can be achieved by selective biological degradation or by preparation of diastereo isomer salts of the 2-(6-methoxy-2-naphthyl)propionic acid with are solved optically active base such as cinchonidine and then separating the thus formed diastereo isomer salts by fractional crystallization. The separated diastereo isomer salts are then acid cleaved to yield the respective d 2-(6-methoxy-2-naphthyl)propionic acid.

The compounds of Formula I can be prepared by reacting 2-acetyl-6-methoxynaphthalene (a known compound) with sodium borohydride in ethanol at room temperature for 30 minutes followed by gently acidifying the reaction mixture with dilute hydrochloric acid and extracting the reaction product with diethyl ether. The ether phase is evaporated to dryness to yield the corresponding alcohol. The residue is reacted with p-toluenesulfonyl chloride in pyridine at room temperature for about 15 hours followed by extraction with ether, washing with dilute hydrochloric acid, and evaporating the ether phase to dryness to yield a residue containing the corresponding p-toluenesulfonate. The residue of this reaction is then reacted with excess lithium halide (lithium bromide, chloride or iodide) in acetone for 24 hours at room temperature, and the reaction mixture is diluted with water and extracted with ether. The ether phase is then evaporated to dryness to yield the corresponding 2-(1-bromoethyl)-6-methoxynaphthalene, 2-(1-chloroethyl)-6-methoxynaphthalene, and 2-(1-iodoethyl)-6-methoxynaphthalene of Formula I.

The compound of Formula II exhibit anti-inflammatory, analgesic and anti-pyretic activities and accordingly employed in the treatment of inflammation, pain and pyrexia in mammals. For example, inflammatory conditions of the muscular skeletal system, skeletal joints and other tissues can be treated. Accordingly, this compound is useful in the treatment of conditions characterized by inflammation such as rheumatism, concussion, laceration, arthritis, bone fractures, post-traumatic conditions and gout.

This invention is further illustrated by the following specific but non-limiting examples.

EXAMPLE 1

A solution of 12.5 g. of 2-(1-bromoethyl)-6-methoxynaphthalene in 200 ml. of t-butanol containing 11.5 g. of potassium t-butoxide is treated with 50 g. of nickel carbonyl, and the reaction mixture is heated at 50° C. for 24 hours. The mixture is then evaporated to dryness. Addition of 200 ml. of 6 N hydrochloric acid followed by heating under reflux for 12 hours yields 2-(6-methoxy-2-naphthyl)propionic acid which is extracted with ether. The ether phase is evaporated to dryness, and the residue recrystallized from acetone-hexane.

EXAMPLE 2

A solution of dl 2-(6-methoxy-2-naphthyl)propionic acid in methanol is prepared by dissolving 230 g. of the product of Example 1 in 4.6 l. of warm methanol. The resulting solution is boiled until it become turbid; then sufficient methanol is added to a solution of 296 g. of cinchonidine in 7.4 l. of methanol heated to about 60° C. The solutions are combined while stirring, and the combined mixture is then allowed to reach room temperature over a 2 hour period. After the reaction mixture has reached room temperature, it is stirred for an additional 2 hours and then filtered. The filtered solids are washed with several portions of cold methanol and dried.

100 grams of the cinchonidine salt crystals are added to a stirred mixture of 600 ml. of ethyl acetate and 450 ml. of a 2 N aqueous hydrochloric acid. After the mixture has been stirred for 2 hours, the ethyl acetate layer is removed and washed with water to neutrality, dried over sodium sulfate and evaporated to yield d 2-(6-methoxy-2-naphthyl)propionic acid.

I claim:
1. A 2-(1-haloethyl)-6-methoxynaphthalene wherein the halo group is bromo, iodo or chloro.
2. As a compound of claim 1, 2-(1-bromoethyl)-6-methoxynaphthalene.

References Cited

Elsevier's Encyclopedia of Organic Chemistry (1950), Series III, vol. 12B, pp. 1464–1467.

BERNARD HELFIN, Primary Examiner

U.S. Cl. X.R.
260—520, 525, 999